United States Patent [19]

Bowden, Jr.

[11] 4,323,350
[45] Apr. 6, 1982

[54] ANATOMICAL MODEL

[76] Inventor: Robert L. Bowden, Jr., Rte. 2, Box 295, Germantown, N.C. 27019

[21] Appl. No.: 189,805

[22] Filed: Sep. 22, 1980

[51] Int. Cl.³ .............................................. G09B 23/30
[52] U.S. Cl. ...................................... 434/269; 428/16
[58] Field of Search ............... 40/158 R, 160; 428/13, 428/16; 434/152, 262, 267, 269, 270, 274, 295, 296, 301

[56] References Cited

U.S. PATENT DOCUMENTS

| | | | |
|---|---|---|---|
| 3,106,786 | 10/1963 | Collins | 434/270 |
| 3,137,080 | 6/1964 | Zang | 40/160 X |
| 3,271,879 | 9/1966 | Sackler | 434/270 |
| 3,310,885 | 3/1967 | Alderson | 434/267 |
| 3,613,265 | 10/1971 | Stern | 434/297 |

FOREIGN PATENT DOCUMENTS

| | | | |
|---|---|---|---|
| 506815 | 6/1939 | United Kingdom | 434/297 |
| 1304176 | 1/1973 | United Kingdom | 40/158 R |
| 1324359 | 7/1973 | United Kingdom | 434/297 |

OTHER PUBLICATIONS

NTA Anatomical Model, pp. 47-50, Jan. 1969, The Science Teacher.

Primary Examiner—Harland S. Skogquist

[57] ABSTRACT

An anatomical model comprises a plurality of molded sections of uniform thickness, each of which has a flesh appearance on one side and on the opposite side a colored photograph of an actual body specimen with the sections being adapted for serial assembly to provide a realistic appearing sectioned body model suitable for anatomical study.

2 Claims, 4 Drawing Figures

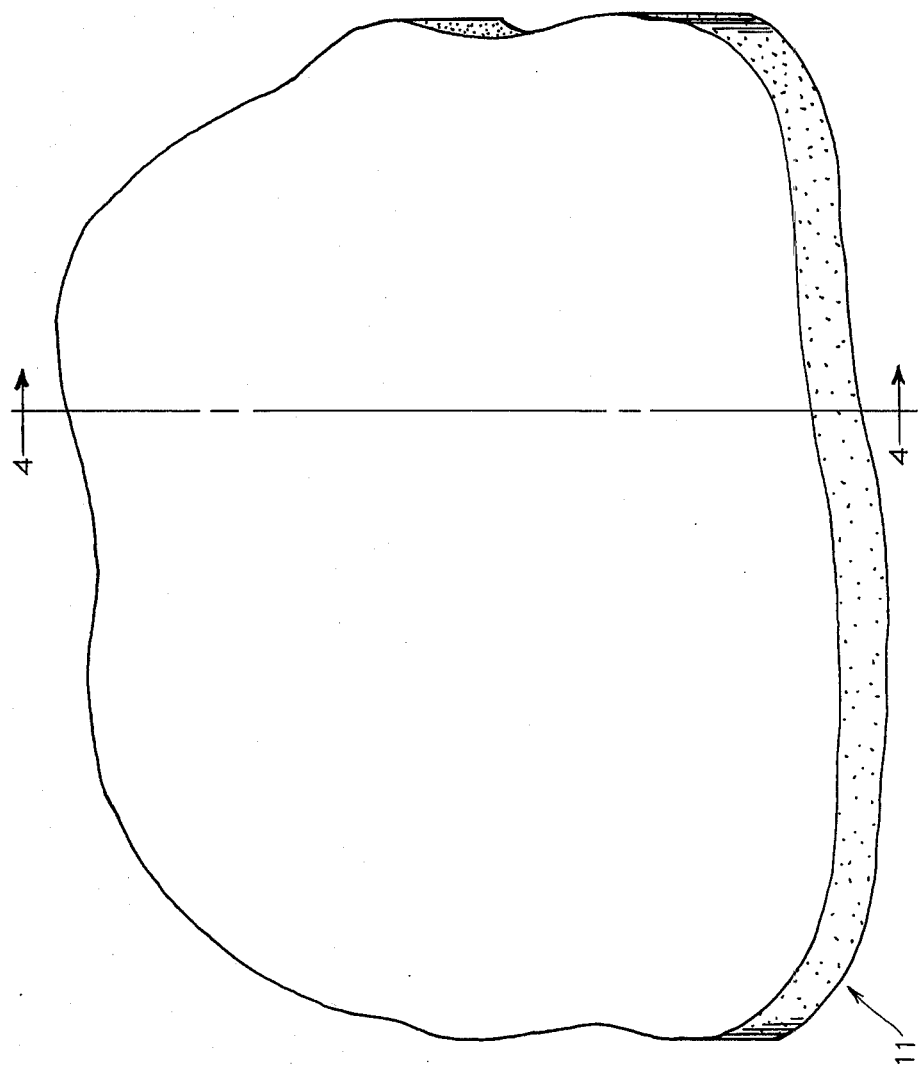

ANATOMICAL MODEL

DESCRIPTION

1. Technical Field

The invention relates to anatomical models of the type employed in anatomical studies of the human body by medical personnel.

2. Background Art

It is generally regarded as essential that those involved in studying in the medical field should have available cadavers for accurate life-like anatomical models. Since true anatomical specimens are often preserved in toxic solutions, various health hazards are involved when such true specimens are either used or transported. For these reasons and also because of various legal restrictions against shipment of human material, there is a demand for having life-like anatomical models which simulate actual anatomical specimens insofar as possible but which avoid the mentioned health hazards.

U.S. Pat. Nos. 1,104,067; 1,141,480; 3,276,146; and 3,310,885 are illustrative of prior art practices related to providing anatomical models aimed at simulating as close as possible anatomical sections taken through an actual human or animal cadaver. A review of these prior art references and all other known anatomical model practices indicate a need for having a more life-like anatomical model which can be adapted to any selected portion of the body, which will be life-like in appearance, which will exhibit characteristics of durability and toughness, which can be contoured to the actual contour of the body portion being simulated, and which can be used to present an essentially true gross morphology and which can be more readily associated with new medical techniques particularly those associated with making body scans. Thus, there is a need for more informative and more useful anatomical models for showing natural coloring, skin and bone and otherwise revealing fine detail in true size and relationship and the providing of such becomes the principal object of the invention.

DISCLOSURE OF INVENTION

In accordance with the present invention, there is provided an anatomical model of some selected portion of the body, e.g., the torso, consisting of transverse sections making up the body portion and with the sections comprising clear plastic covered color photographs embedded in individual flesh colored plastic molded base pieces whose shape, thickness, color and general form realistically simulate natural sections. The section photographs and base pieces on which the photographs are mounted when assembled together present the right contour, are presented in the right orientation, in the right series, are permanent, are durable and not easily broken or damaged and present a true picture of changes that naturally take place from section to section through the selected portion of the body.

BRIEF DESCRIPTION OF DRAWINGS

FIG. 3 is a pictorial view of the opposite side of the section shown in FIG. 3 and typically flesh colored according to the invention.

BEST MODE FOR CARRYING OUT THE INVENTION

Figure 1:
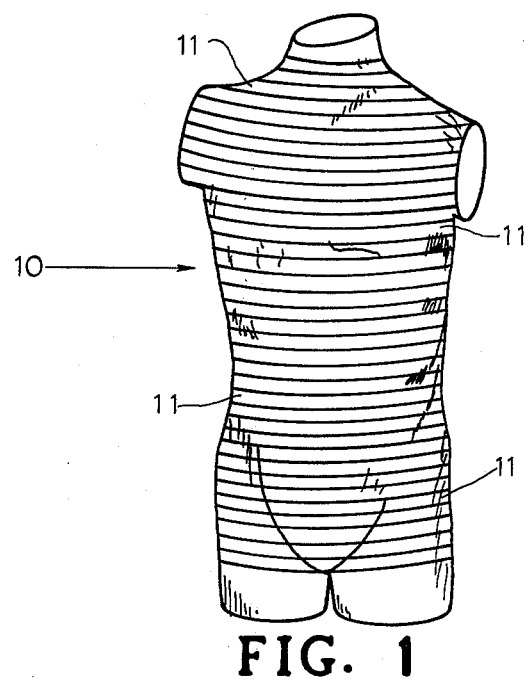
FIG. 1 is a pictorial view of an anatomical model according to the invention illustrating assembled sections of a simulated torso.
Figure 4:
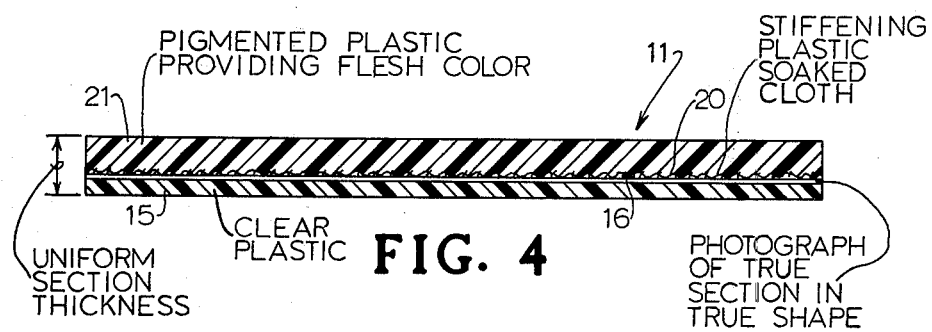
FIG. 4 is a section view taken on line 4—4 of FIG. 3.

While the anatomical model of the invention is applicable to the study of any desired individual human or animal organ or body portion, the invention is illustrated in the form of individual sections adapted to be assembled in the form of a simulated anatomical human torso model.

With reference to the drawings, a simulated anatomical model 10 constructed in accordance with the invention comprises a series of horizontal sections 11 adapted to be assembled together to form the anatomical model 10. Recognizing that a cadaver is normally sectioned in sections of uniform thickness, e.g., one centimeter, and further recognizing that the sections are typically viewed from an inferior direction, i.e., from bottom to top, the sections 11 are also of a standard uniform one centimeter thickness and each section mounts a color photograph of the corresponding section of an actual cadaver on which the model 10 is based and as viewed from the inferior side.

From the foregoing, it will be appreciated that when sectioning an actual human cadaver torso to be used as the basis for an anatomical model according to the invention, the making of color photographs of the inferior side of each section is a required initial step. Such color photographs taken serially in the same order as the sections will, of course, provide a means for preserving the actual life-like appearance of the respective sections on which the invention model is to be based and thereby provide a means for realistic study of the actual human cadaver torso on which the model was based.

The color photographs of the human cadaver torso on which the sections 11 of the anatomical model 10 of the invention are to be based should, of course, be of high quality with specific attention to accurate reproduction of color and detail, all of which are easily obtained with modern color photographic techniques. After the color photographs of the sections have been taken and developed, the next step is that of mounting each color photograph on a base in the right series and right orientation. For this purpose, an open top, glass enclosure is constructed so as to provide a container having a transparent bottom somewhat larger in size than the size of the largest color photograph to be processed and adapted to hold the plastic liquid in which each photograph is embedded. The glass enclosure is elevated, leveled, and located above a mirror. A layer 15 of clear catalyzed plastic about ⅛ inch thick is poured into the glass enclosure and is allowed to partially harden. Layer 15 effectively provides in the finished section 11 a clear, durable and protective cover for the section photograph 16. After the plastic layer 15 has partially hardened, the section photograph 16 of the first section 11 to be formed is trimmed from the print so as to represent not only the true appearance but also the true shape and size of the corresponding human cadaver section corresponding to the particular section photograph 16. After the photo trimming operation, the selected photograph 16 is soaked in a clear, uncatalyzed plastic. The plastic-soaked photograph 16 is now placed on top of the clear, partially hardened, plastic layer 15 with the photograph facing down. Using the previously-mentioned mirror located beneath the transparent bottom of the enclosure now holding the plastic layer 15 as well as the photograph 16, any air bubbles are worked out from between the photograph 16 and the plastic layer 15 so as to provide a smooth bond between photograph 16 and layer 15.

In the next step, a piece of fiberglass cloth 20 somewhat larger in size than the size of the photograph 16 is soaked in uncatalyzed plastic and the plastic-soaked cloth 20 is placed over and adhered to the back of the photograph 16. Next, a layer 21 of flesh colored, pigmented, catalyzed plastic is poured into the enclosure on top of the fiberglass cloth 20 until a desired uniform section thickness, e.g., one centimeter, is achieved. The final flesh-colored layer 21 is allowed to harden and such hardening process may be facilitated by placing a piece of wax paper or other suitable covering material on top of plastic layer 21 to speed up the hardening process.

It will, of course, be understood that the described process is carried out for each section 11 and after each section 11 has been formed in the mentioned glass enclosure, a band saw or other cutting means is used to trim the section 11 to a size slightly larger than the size of the trimmed photograph 16 and final sizing and contouring of each section 11 is achieved by sanding each section 11 in turn down to the size of the respective section photographs 16.

Figure 2:
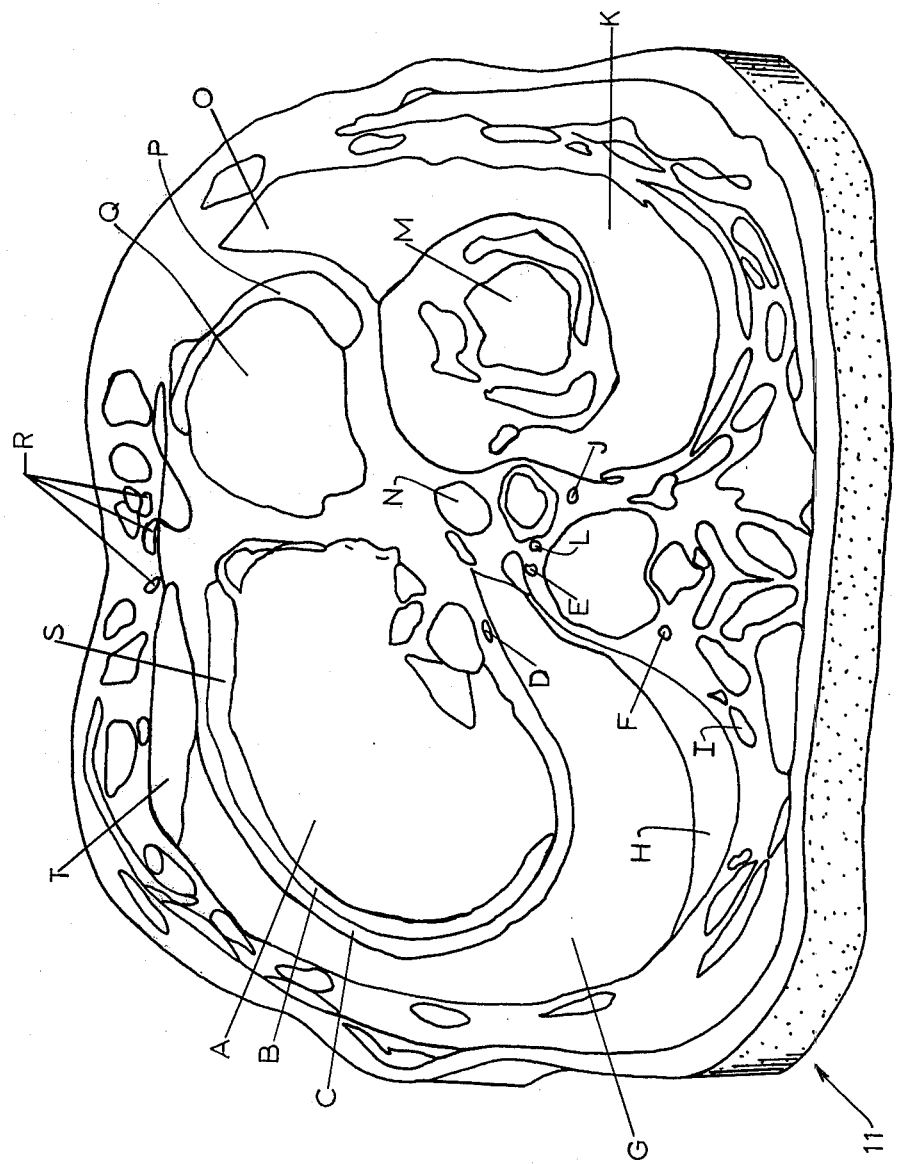
FIG. 2 is a pictorial view illustrating one side of one of the body sections having a color photograph embedded therein.

After all of the sections 11 have been formed in the manner described, they can then be assembled in the right sequence and orientation to form the anatomical model 10 of the invention providing a realistic duplication of the actual sectioned human cadaver torso on which the invention model 10 was based. Anatomical model 10 of the invention thus provides a life size anatomical model revealing the natural coloring, skin, bone, fine detail and essentially a realistic duplicate of the characteristic of the human cadaver torso sections on which the model was based. The clear plastic layer covering photograph 16 can be easily marked for purposes of study and explanation of the anatomy and at the same time provides a permanent and durable protective cover for the section photograph. Simply to illustrate the detail which can be readily achieved, FIG. 2 has been labeled to illustrate parts of the body that can be photographed and the photographic detail preserved according to the invention as follows:

A—Right lobe of the liver
B—Peritoneal cavity
C—Diaphragm
D—Inferior phrenic vessels
E—Azygos vein
F—Sympathetic trunk
G—Right lower lobe of lung
H—Pleural cavity
I—Intercostal vessels
J—Hemiazygos vein
K—Left lower lobe of lung
L—Thoracic duct
M—Stomach
N—Esophagus
O—Lingular segment of left upper lobe of lung
P—Pericardial fat
Q—Heart
R—Internal mammary vessels
S—Falciform ligament
T—Right middle lobe of lung While the preferred form of the anatomical model 10 of the invention is a life size form, the invention recognizes the possibility of utilizing reduced size section photographs and constructing a scaled down size model for ease of transport in giving lectures and like situations. Also, while the illustrated embodiment has utilized a human cadaver torso as the basis for constructing the anatomical model 10 of the invention, the invention, of course, also recognizes that other models could be made according to the invention using longitudinal or blank sections taken of other portions of the body, e.g., the head, an arm, and a leg, or the like. The invention is also recognized as being especially adapted to be used for making models of specific organs, e.g., the heart, liver, or the like. Recognition is also given to the fact that the invention adapts readily to anatomical models of portions of a deceased animal body as well as to a selection portion of a deceased human body.

I claim:

1. An anatomical model for simulating a selected uniformly sectioned portion of a deceased body, comprising:
    (a) a plurality of sections of uniform thickness adapted to be assembled in serial order to simulate in a corresponding serial order the assembly of sections making up the body portion on which the model is based with each said section comprising a structure made up of:
        (i) a first optically clear plastic layer;
        (ii) a color photograph covered by and viewable through said layer and comprising a color photograph of the inferior side of a corresponding section of said selected body portion and showing the natural color and shape thereof;
        (iii) a stiffening member adhered to the back of said photograph; and
        (iv) a second plastic layer adhered to said stiffening member and colored in a flesh tone corresponding to a flesh color found in said selected body portion and having a thickness selected to provide said uniform section thickness; and
    (b) said sections being contoured such that each section and the photograph thereon represents the actual true-to-life appearance in color and the actual contour of a corresponding section in said selected body portion and when assembled in the corresponding serial order is adapted to mate with all other sections to simulate the actual shape of said selected body portion on which said model is based.

2. An anatomical model as claimed in claim 1 wherein said stiffening member comprises a plastic soaked, cloth member formed of glass fiber.

* * * * *